(12) United States Patent
Bode

(10) Patent No.: US 11,014,590 B2
(45) Date of Patent: May 25, 2021

(54) ROLLING LEVER DUMBBELL HANDCART METHOD

(71) Applicant: Roberto Manuel-German Bode, Evanston, IL (US)

(72) Inventor: Roberto Manuel-German Bode, Evanston, IL (US)

( * ) Notice: Subject to any disclaimer, the term of this patent is extended or adjusted under 35 U.S.C. 154(b) by 0 days.

(21) Appl. No.: 16/587,028

(22) Filed: Sep. 29, 2019

(65) Prior Publication Data

US 2020/0023874 A1   Jan. 23, 2020

Related U.S. Application Data

(62) Division of application No. 15/642,036, filed on Jul. 5, 2017, now Pat. No. 10,494,005.

(51) Int. Cl.
    *B62B 1/22*   (2006.01)

(52) U.S. Cl.
    CPC ............ *B62B 1/22* (2013.01); *B62B 2203/04* (2013.01)

(58) Field of Classification Search
    CPC .. B62B 1/22; B62B 1/142; B62B 1/16; B62B 1/24; B62B 1/264; B62B 1/12; B62B 1/26; B62B 1/06; B62B 1/10; B62B 2202/10; B62B 2202/02; B62B 2202/20; B62B 2202/41; B62B 2203/04; B62B 2203/02; B62B 2203/42; B62B 2203/10; B62B 2203/13; B62B 3/0625; B62B 3/0606; B62B 5/0089; B65F 1/1452; F41A 9/87
    See application file for complete search history.

(56) References Cited

U.S. PATENT DOCUMENTS

| | | | | |
|---|---|---|---|---|
| 1,137,993 A * | 5/1915 | McCarthy | ................. | B62B 1/12 280/43.1 |
| 1,255,484 A * | 2/1918 | Stephens | ................. | B62B 1/264 414/457 |
| 1,510,456 A * | 10/1924 | Cadwalader | ............ | B62B 1/264 414/454 |
| 1,732,153 A * | 10/1929 | Crichton | ................. | B62B 1/264 414/444 |
| 2,405,862 A * | 8/1946 | Toomey | ................. | B62B 1/264 414/450 |
| 2,886,273 A * | 5/1959 | Wachob | .................... | B65G 7/08 248/129 |

FOREIGN PATENT DOCUMENTS

GB                695793 A *   8/1953   .............. B62B 1/02

* cited by examiner

*Primary Examiner* — Glenn F Myers

(57) ABSTRACT

The Rolling Lever Dumbbell Handcart Method is a method of using a handcart to lift a dumbbell, that is organized with a curved front structure that creates a varying effective fulcrum for lifting dumbbells. This method solves the repeated strain problem associated with having to lift a dumbbell up to a necessary height. The operation of the method works by having the operator lean the entire handcart forward so that the front curved portion rolls forward upon the flooring. The Dumbbell is then secured and the same rolling motion is performed in the reverse direction. Once the Handcart is lifted to its upright position it can then be rolled to another location where it can then be leaned forward again to place the Dumbbell in a new location.

9 Claims, 4 Drawing Sheets

ROLLING LEVER DUMBBELL HANDCART METHOD

CROSS-REFERENCES

This application is a Divisional Application claiming the benefit of U.S. Non-Provisional application Ser. No. 15/642,036 having a filing date of Jun. 5, 2017, which is incorporated in its entirety.

FIELD OF INVENTION

The present invention is a handcart and method which reduces the amount of lifting force needed to lift objects and transport them by mechanical means.

BACKGROUND OF INVENTION

The present invention is a machine and method that can be utilized by the user to lift and transport heavy objects. Similar machines can go by names such as hand-truck, handcart and dolly, but do not typically lift their respective cargos in the same way as the Rolling Lever Dumbbell Handcart Method which both acts as a transporter of the cargo and lift. The problem of lifting heavy objects is often the source of injury and strain, especially in cases where the body of the person may not be acclimated to lifting the given amount of weight. Athletic gyms often have employees that must lift several dumbbells in a day to prevent tripping safety hazards on the premises. Because the rack for the weights is at a higher position than the floor, the employee must to lift the weight up to different heights for each dumbbell, each time they complete this routine.

This process of having to lift weights that can be over one hundred pounds, can be strenuous to the employee possibly causing injury. This Rolling Lever Dumbbell Handcart Method decreases the possibility of injury to the user from repeatedly lifting heavy dumbbells, by reducing the amount of lift force that the user would have to exert to lift the dumbbell, carry it and place it in a final location. Another added benefit to the Rolling Lever Dumbbell Handcart Method is that it utilizes no external power sources, and is of simple durable design which can be easily operated by one person, making it ideally structured for the athletic gym environment.

SUMMARY OF INVENTION

The invention disclosed is a method of using a hand operated wheeled cart that is specifically shaped to utilize mechanical advantage in the lifting of dumbbells to a given height for transport and placement. The name of the invention is the Rolling Lever Dumbbell Handcart Method, and will refer to the structure portion in the rest of the specification as a handcart. This written description begins with the handcart on a floor, oriented so that it is standing up with its top user handle farthest from the ground and the lowest portion of the handcart in contact with the ground. This axis directly between and connecting the upper portion user handle and the lower portion wheeled base, will be called vertical axis.

The handcart frame can be constructed of any hard material of suitable strength such as metal, plastic, wood or other high strength materials, though a lightweight material is desirable to reduce needed lift force. The wheels are located on the rear section of the handcart just behind the lowest portion of the handcart raised above the ground, so that when the lowest portion of the handcart frame is touching the ground in an upright orientation the wheels will not be touching the ground. The lowest portion of the handcart frame can also be called the secondary fulcrum, and will have suitable friction material such as a rubber covering for frictional contact to prevent slippage. The wheels can be attached with a suitable one way bearing system to allow for rotation in one direction for forward handcart travel only, and then fixedly attached to the handcart in said location behind the lowest portion toward the rear of the base.

The front portion of the frame that is bent will extend forward and upward in an arced shape, beginning at the lowest portion of the handcart on the bottom of the base and will end at some distance in front of the handcart, at a desired height at or near the midway point of the vertical axis. The curvature of the bent portion should be in a way that the center of curvature for the bent portion is located somewhere to the rear of the handcart to create desired amount of curvature. The bent portion shape is so that the effective fulcrum of the handcart when lifting a dumbbell travels down along the vertical axis, creating variable level arms to the upper lift handle and the dumbbell securing mechanism, to lift the given weight. The actual fulcrum changes its position depending on where along the transition of the handcart is from its lowered position to its upright position due to variable contact with the ground along the bent portion of the frame.

When the handcart is in its horizontal lowered position the length of the user's input lever arm is from the upper handle to an effective fulcrum along the vertical axis above the highest point of the front bent portion, and the output lever arm is from the effective fulcrum to the lift arm. Because the input user lever arm is already longer in length than the output lever arm to the lift arm holding the dumbbell, there is already mechanical advantage in the system that will lessen the amount of force needed to be applied to lift the dumbbell. As the user pulls up on the upper handle, the user input lever arm increases in length because of new points of contact between the front bent portion and the ground causing the effective fulcrum located on the vertical axis to move toward the secondary fulcrum at the base. Consequently, the output lever arm for the lift arm lifting the dumbbell will increase as well, causing less mechanical advantage. But as the user continues to raise the handcart, the user body position becomes more comfortable to handle the increased force needed. When the handcart is in its upright position, the user's input lever arm of the mechanical system is the length of the handcart from the secondary fulcrum to the user handle, and the output lever arm to the dumbbell is from the secondary fulcrum to the lift arm.

The outer edge of the bent portion of the handcart frame will have a frictional material such as rubber attached to it facing forward to hold the handcart in static frictional contact when the handcart is in the process of leaning forward for lifting or lowering. The front bent portion will then terminate and the frame will continue towards the vertical axis, and continue to extend upward until the upper user handle location. Located above the midway point of the vertical axis will be an elongated piece of frame material called the lift arm structure, said lift arm structure being attached to a means for stably securing the dumbbell in its current position so that it can be lifted by the handcart, and an actuation lever for actuating the securing mechanism. Securing of the dumbbell can be accomplished by a clamping mechanism, latched lifting hook or other suitable means of grabbing and stably securing the dumbbell when the handcart is in use. The elongated lift arm structure with securing mechanism and actuation lever, can be called the lift arm, and will be attached to the to the frame so that it is free to rotate up down for rotational control of the dumbbell when secured.

BEST MODE OF USING INVENTION

The best mode of the invention would have the front bent portion of the handcart of the invention terminating at a height near midpoint of the total height of the handcart. The center of curvature for the for the front bent portion would be located at a height midway in position relative to the vertical axis, and be a distance far enough behind the handcart to cause the front bent portion of the handcart to extend forward to a distance roughly equivalent to thirty percent the total height of the handcart. The handcart would utilize the latching hook style of securing the dumbbell, the latch being operated to open and closed positions by the actuation lever located on the other side of the lift arm structure by connecting cable. The user will locate a dumbbell that is either at a location on the ground or at a raised location.

When the dumbbell is located on the ground, the user should place the handcart a suitable distance from the dumbbell initially located so that when the handcart is leaned forward causing the front bent portion to roll along the ground, allowing the upper portion of the bend to terminate near the location of the dumbbell. While the handcart is laying on the ground in its lowered positon, the user will utilize the latch hooking mechanism to secure the dumbbell for lifting. The user will then pull upward on the user handle located near the upper portion of the handcart utilizing the effective fulcrum and front bent portion. As the user is pulling upward, the dumbbell should be lifted by the contact of the bent portion of the handcart with the ground. The bent portion of the handcart should be in contact with the ground as the user continues to lift the handcart to its upright positon. When the handcart has been lifted to its upright positon with dumbbell secured, the user will then continue to pull back on the handle causing a rotation about the secondary fulcrum toward the user, to utilize the rear wheels to move the handcart to desired location with the dumbbell secured. Once the user arrives at the desired location, they can lean the handcart forward utilizing the lowest portion of the handcart as a fulcrum and place the dumbbell on a rack or position of greater height than on the ground by resting it on the rack or new position and actuating the latching mechanism to free the dumbbell.

For the user to utilize the handcart when the dumbbell is not on the ground, but on an elevated position, they follow the same general steps of operation in reverse. This would mean that the user will hook and secure the dumbbell from a location not on the ground and utilize the lower portion of the handcart as a fulcrum to lift the dumbbell, position the handcart so that the user can use the rear wheels. Move the dumbbell to a desired location and then lean the handcart forward so that the bent portion rolls along the ground, thereafter utilizing the latching mechanism to release the weight on to the ground.

DRAWINGS

FIG. 1 is a frontal view of the handcart showing the front bent portion of the handcart, also containing the designated zones for upper and lower portions.

FIG. 2 is a side view of the handcart from the right side, showing the bent portion facing toward the right of the image, also containing the designated zones for front and rear portions.

FIG. 3 is a perspective view of the handcart from a frontal raised right positon.

FIG. 4 is a side view of different positions of the handcart during the action sequence of using it to lift a dumbbell.

Figure 1:
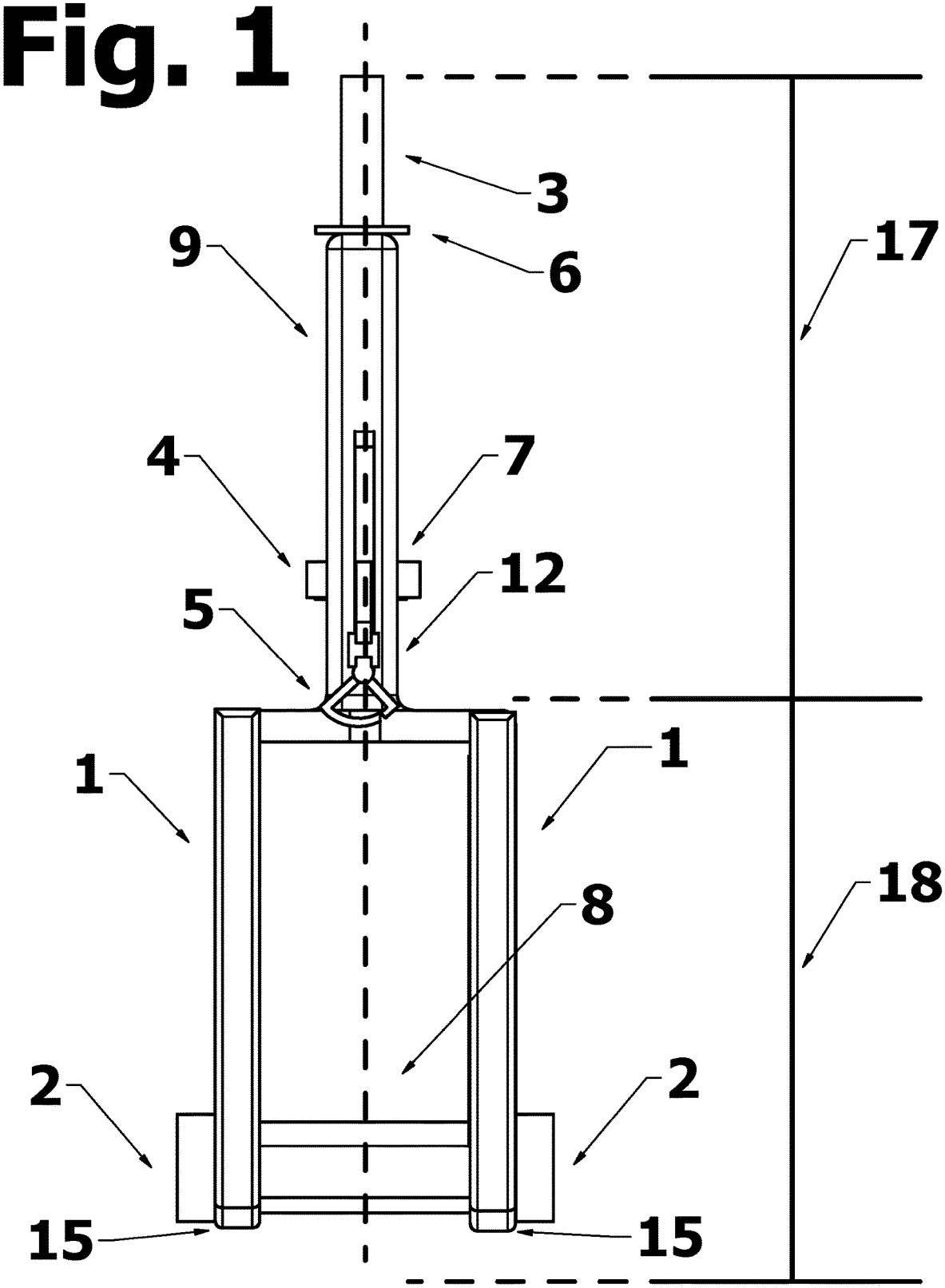
FIG. 1 shows the front bent portion of the handcart 1 that is covered in a rubberized material and can be seen to extend from the secondary fulcrum located at lowest portion of the handcart 15 below the wheels 2, connecting to the frame and continuing to connect with the bent portion of handcart frame. Front bent portion 1 of this figure is the portion of the frame that will contact the ground when lifting the dumbbell. The dumbbell latch hook 5 which can rotate about angle at pivot point 12, is attached to a lift arm structure pivotally attached to the frame at 7 for positioning. The lift arm structure 10 then continues through and behind the handcart to a rear handle 4 that includes a handle for actuation of the dumbbell latch hook 5. This actuation can be conducted by any suitable means such as a cable running along the lift arm structure 10. The handcart frame 9 then continues up along the vertical axis 8 to the handle guard 6 and upper handle 3. This figure also indicates the positioning and extent of the upper portion 17, and the lower portion 18.
Figure 2:
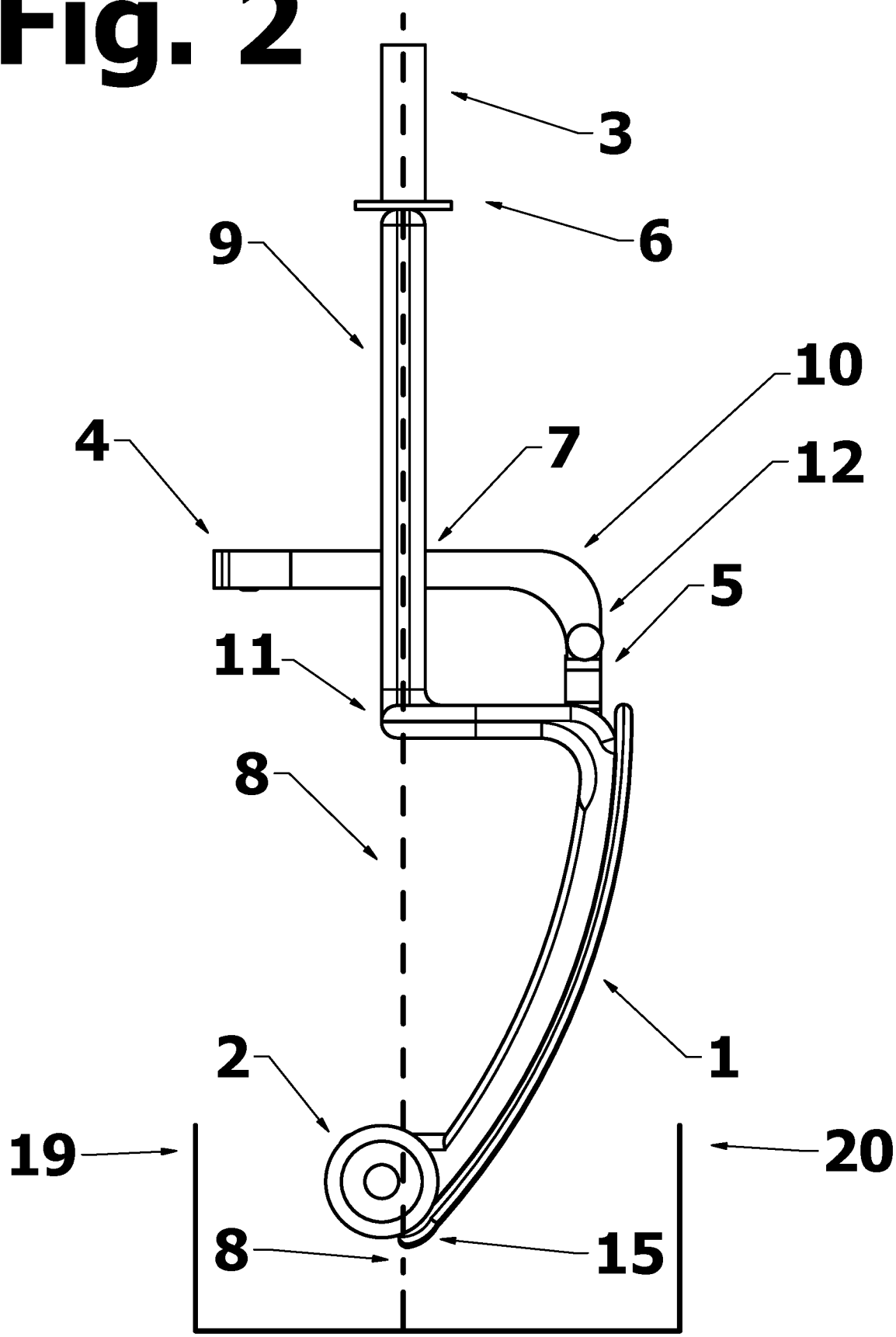
FIG. 2 shows the front bent portion of the frame 1 that is covered in a rubberized material. The front bent portion of the handcart 1 of this figure is the portion of the frame that will contact the ground when lifting the dumbbell from its original position utilizing the latching hook mechanism 5. As the frame continues upward from front bent portion 1 of the handcart, the frame bends backwards to section 11 on the vertical axis 8 and then continues up to frame section 9 of the handcart frame. On the upper section of the frame below frame section 9 is where the lift arm structure 10 will be pivotally connected to the handcart frame. The lift arm latch hook 5 which can freely rotate through angle about pivot point 12, being actuated by the lift arm handle 4. Section 9 of the handcart then continues upward to the handle guard 6 connecting to the upper handle 3. This figure also indicates the position and extent of the rear portion 19, and front portion 20.
Figure 3:
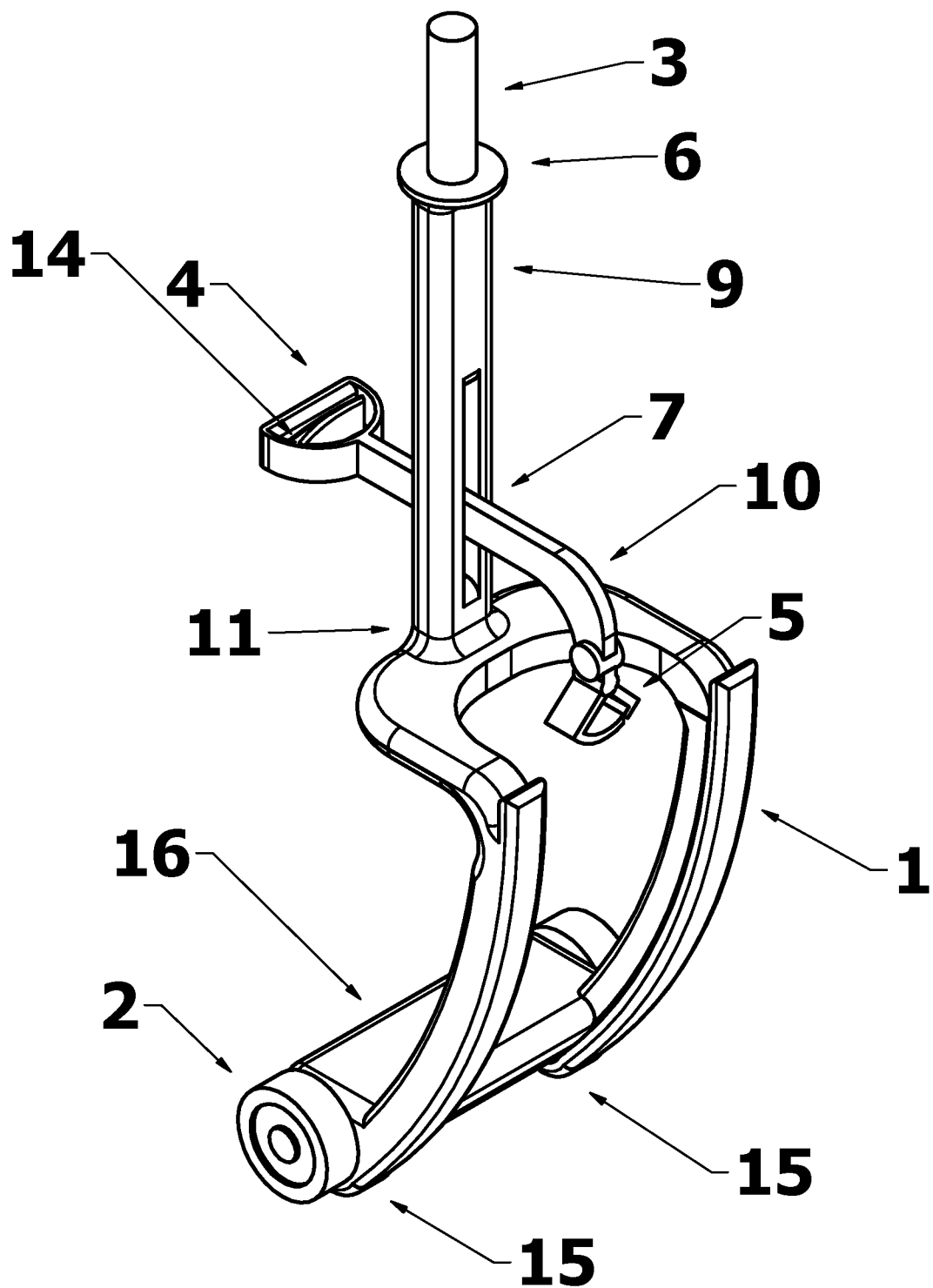
FIG. 3, is the perspective drawing of the invention showing the inside of the lift arm handle 4 so that the actuation initiation lever 14 can be seen. The wheels 2 with ability to roll, are attached to the base 16 located at the bottom of the handcart, so that when the handcart is oriented upright the wheels will not be in contact with the ground. This view shows the characteristically arced angle of the front bent portion 1 which would be rubberized. This bent portion 1 should be progressive in curved arcing to allow for smooth transition from leaned over position to upright position. The bent portion 1 extends to section 11 of the frame, extending through frame section 9 terminating at the user handle guard 6 and handle 3. The lift arm structure 10 is shown, as well as the pivotally attached latch hook mechanism 5 which can be actuated by a cable system or other means contained in the lift arm structure 10 extending to the lift arm handle 4 and actuation initiation lever 14.
Figure 4:
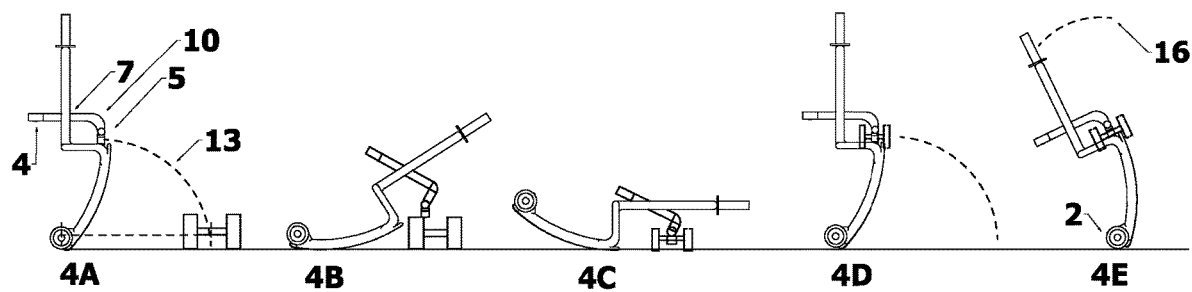
FIG. 4 shows the invention during use. The starting position is the upright position 4A, followed by the leaning forward position 4B along the path of 13, thirdly position 4C is the lowered position whereby the user utilizes the lift arm structure 10 to position and secure the dumbbell with the latching hook 5 actuated by the actuation initiation lever 14. After the dumbbell is secured, the handcart will be lifted to its final position of lift 4D. The user would then normally continue to pull the handcart a short distance 16 to the position in 4E, where the wheels 2 would be used to transport the given dumbbell to another location.

To the extent this Invention description and drawings disclose more subject matter than what is claimed in the single claim written below, that subject matter is not dedicated to the public, and the right to claim that invention in a subsequent application is reserved. Though the claim presented here is narrow, it should be noted that the scope of the invention here is broader than what is claimed. It is intended that any future applications claiming priority from this application may have broader claims submitted.

What is claimed is:

1. A method of lifting a dumbbell using a handcart comprising: a first step of obtaining a handcart having a vertical axis extending from a lower portion to an upper portion of the handcart, wherein the vertical axis is in an upright orientation at a starting location on a floor, a second step wherein the handcart is leaned forward so that a front bent portion of the handcart has frictional contact with the floor at different distances progressing from the starting location throughout the leaning motion of the handcart, the frictional contact with the floor occurring between the starting location and at least half the distance to the location of the dumbbell, a third step wherein the handcart is leaned forward to a first leaned orientation creating an angle between the vertical axis and the floor, wherein the angle is between 0 and 20 degrees, a fourth step wherein the upper portion of the handcart has a lift arm structure and latch hook that is used to grip the dumbbell, a fifth step wherein the handcart is lifted from the first leaned orientation with the vertical axis parallel to the floor, to a second orientation wherein the vertical axis is at least perpendicular to first floor orientation, wherein the average force required to lift the dumbbell with the handcart is less than the amount of force required to lift the dumbbell without the handcart to a same height, wherein the lower portion of the handcart further comprises a base at the lowest point of the handcart, wherein the reduction in lifting force required is reduced by the change in position of an effective fulcrum along the vertical axis, the effective fulcrum moving from a location between one quarter and three quarters the length of the vertical axis, to a location along the vertical axis located within one quarter the length of the vertical axis from the base, through the lifting motion.

2. A method of lifting an object using a handcart comprising: a first step of orienting a handcart having a vertical axis extending from a lower portion to an upper portion of the handcart in an upright orientation, a second step of leaning the handcart forward with the upper portion toward the object, while a lower most floor contact portion pivots upon a floor during an initial forward leaning motion, wherein a continued forward leaning motion of the handcart causes a front curved portion of the handcart to have frictional contact with the floor, wherein the frictional contact is between the floor and different sections along the front curved portion progressing from a lower section to an upper section of the front curved portion during the continued leaning motion, a third step wherein the object is initially secured by the handcart at a position that is closer in proximity to the upper section of the front curved portion than the same proximity in the upright orientation of the first step, the third step occurring in a final forward leaning motion orientation wherein the vertical axis is angled more than 45 degrees from the upright orientation of the first step, and the lower most floor contact portion does not contact the floor.

3. The method of claim 2, wherein the third step further comprises, using a lift arm structure of the upper portion of the handcart to secure the object.

4. The method of claim 3, wherein the third step further comprises, using the lift arm structure to grip a dumbbell.

5. The method of claim 4, wherein the third step further comprises using the lift arm structure and a latch hook to grip the dumbbell.

6. The method of claim 4, further comprising a fourth step wherein the handcart is lifted from the final leaning motion orientation to within 45 degrees or less of the upright orientation of the handcart.

7. The method of claim 6, wherein during the fourth step the average force required to lift the dumbbell with the handcart to within 45 degrees or less from the upright orientation of the handcart is less than the amount of force required to lift the dumbbell without the handcart to a same height.

8. The method of claim 7, wherein the lifting force required in the fourth step is reduced by the change in position of an effective fulcrum along the vertical axis, to a location at or near the lower most floor contact portion, throughout the lifting motion.

9. The method of claim 8, wherein the same height that the dumbbell is lifted to is at least 1 foot above the floor.

* * * * *